United States Patent [19]

Palmer

[11] 3,873,782

[45] Mar. 25, 1975

[54] CAPACITIVE PROTECTION COUPLING ELEMENT FOR STYLUS ELECTRODE DISCHARGE

[75] Inventor: Richard Claxton Palmer, Blawenburg, N.J.

[73] Assignee: RCA Corporation, New York, N.Y.

[22] Filed: Feb. 8, 1973

[21] Appl. No.: 330,877

[52] U.S. Cl. ................ 179/100.1 B, 179/100.41 G, 178/6.6 A, 178/6.6 TP

[51] Int. Cl. .......................... G11b 3/44, G11b 9/06

[58] Field of Search ............. 179/100.4 M, 100.1 B, 179/100.41 G, 100.41 P, 100.41 B; 178/6.6 TP; 274/38

[56] References Cited

UNITED STATES PATENTS

| | | | |
|---|---|---|---|
| 2,422,140 | 6/1947 | Sinnett | 179/100.1 B |
| 2,530,087 | 11/1950 | Sinnett | 179/100.4 M |
| 2,754,372 | 7/1956 | Weathers | 179/100.41 G |
| 2,866,856 | 12/1958 | Weathers | 179/100.4 M |
| 3,159,718 | 12/1964 | Richardson | 179/100.1 B |
| 3,783,196 | 1/1974 | Stanley | 179/100.4 M |

FOREIGN PATENTS OR APPLICATIONS

| | | | |
|---|---|---|---|
| 1,181,275 | 12/1964 | Germany | 179/100.1 B |

*Primary Examiner*—James W. Moffitt
*Assistant Examiner*—David K. Moore
*Attorney, Agent, or Firm*—Eugene M. Whitacre; J. B. Hayes; William H. Meagher

[57] ABSTRACT

To protect a playback stylus against arcing, a relatively small value capacitance is provided in series circuit relationship with the stylus electrode. This capacitance limits damaging charge flow through the stylus electrode from the record medium surface.

4 Claims, 4 Drawing Figures

CAPACITIVE PROTECTION COUPLING ELEMENT FOR STYLUS ELECTRODE DISCHARGE

The present invention relates to video playback systems and more particularly to an arrangement of protecting the playback transducer, such as a stylus, against damage by arcing due to an accumulated charge on the record medium used in such systems.

In certain video disc playback systems, video information is recorded by means of geometric variations in the bottom of a spiral groove on the surface of a disc record. The disc surface includes a conductive material covered with a thin coating of dielectric material. A tracking stylus engages the spiral groove and includes a conductive surface or electrode which cooperates with the conductive material and dielectric coating to form a capacitor. Systems of this type are shown in a U.S. Pat. application, Ser. No. 126,678, filed Mar. 22, 1971, and now U.S. Pat. No. 3,783,196, for Thomas Osborne Stanley and entitled, "High-Density Information Records and Playback Apparatus Therefor;" and a U.S. Pat. application, Ser. No. 126,772, filed Mar. 22, 1971, and now U.S. Pat. No. 3,842,194, for Jon Kaufman Clemens and entitled, "Information Records and Recording/Playback Systems Therefor." Both applications are assigned to RCA Corporation.

In systems of the above-described type, as the record is rotated, an edge of the conductive electrode of the stylus, while riding in the disc groove, cooperates with the record to establish capacitive variations due to the geometrical variations in the spiral groove. The capacitor formed by the record and stylus is coupled to a tuned circuit. Consequently, as the record is rotated, the resulting capacitive variations vary the resonant frequency of the tuned circuit. The tuned circuit is energized by a fixed frequency oscillator, and thus, as the resonant frequency of the tuned circuit varies (due to the geometrical variations in the bottom of the spiral groove) the response of the tuned circuit to the excitation signal voltage changes as a function of the recorded information. This provides output signals whose amplitude varies as a function of the recorded information.

The stylus electrode of an electrostatic video disc type pickup is typically very thin. For example, the stylus thickness may be 4,000 A or less. The stylus, therefore, may be damaged by the passage through it of high electrical currents. Such currents may be encountered if the stylus discharges electrical charges accumulated on a section of the record.

The occurrence of charges on the record can be reduced by providing a conductor connected to electrical ground which physically contacts the metallized record surface. However, it has been found that such physical contact grounding of the record, while advantageous, may not protect the stylus under all conditions. For example, the record surface may become scratched in a way that leaves a portion of the metallized surface isolated and thereby able to accumulate charge.

In accordance with the present invention, a capacitance is provided in series circuit arrangement with the stylus which cooperates with the record surface. Thus, only a charge sufficient to charge the series capacitance to the voltage of the record surface is passed through the stylus electrode. Without the provision of such a capacitance, the entire charge stored on the record surface may be conducted through the stylus electrode with the probability of resultant damage to the stylus.

A complete understanding of the invention can be obtained from the following detailed description thereof, when taken in conjunction with the accompanying drawings, in which.

Figure 1:
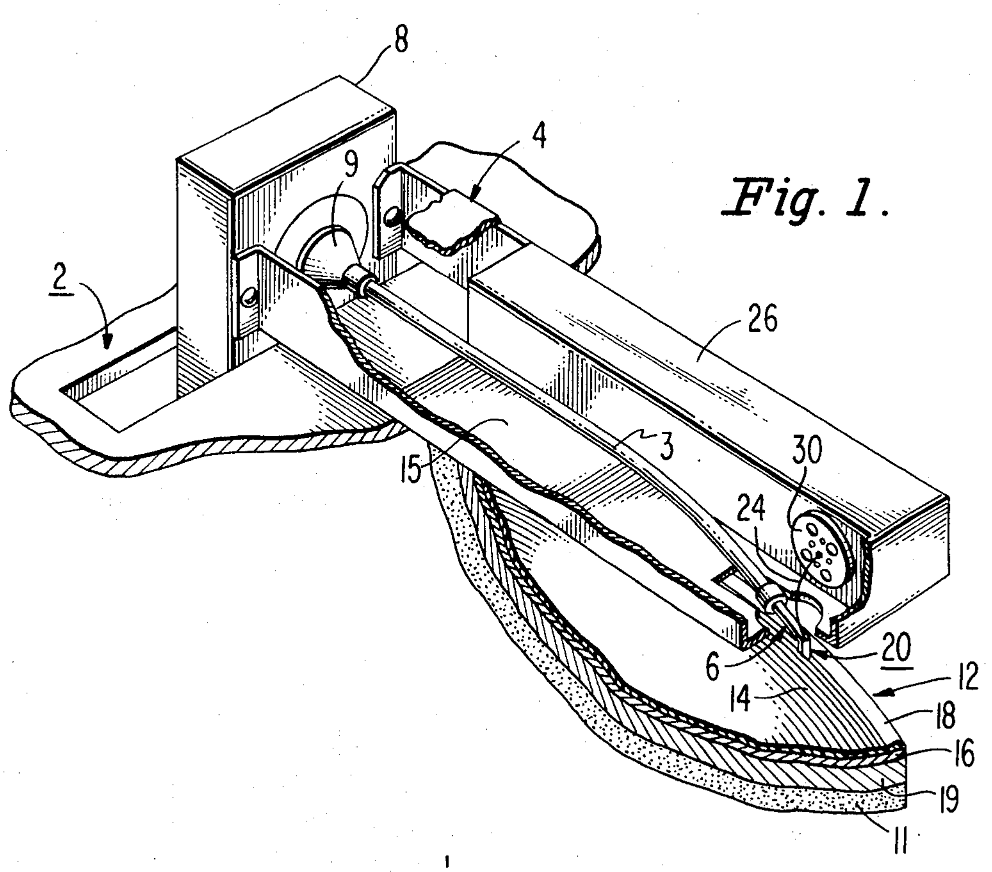
FIG. 1 is a partial perspective view of a video playback system tracking arm and stylus assembly suitable for practicing the present invention.
Figure 2:
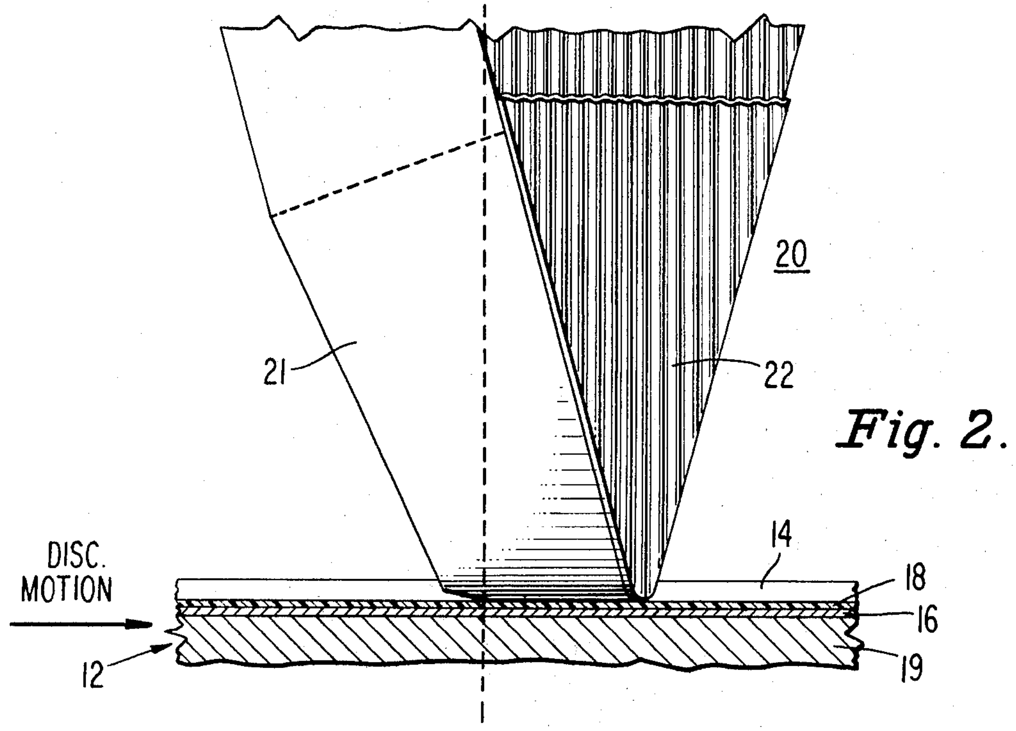
FIG. 2 is a greatly enlarged longitudinal section view of a portion of a record medium groove and a partial perspective view of a tracking stylus of a video disc type playback system.

Reference is now made to the drawings wherein like reference numerals designate similar elements in various views. More particularly, referring to FIGS. 1–3, a video playback system 2 includes a conductive housing 4 enclosing a tracking arm 3 and pickup assembly 6. The conductive housing 4 is mounted to a support member 8 which encloses a groove velocity error correction drive mechanism. A velocity error correction mechanism is described in detail in U.S. Pat. application, Ser. No. 126,797, filed Mar. 22, 1971, and now U.S. Pat. No. 3,711,641, for Richard Claxton Palmer and entitled, "Velocity Adjusting Mechanism," which is assigned to RCA Corporation. The system includes a turntable 11 supporting a video disc record 12. The video disc record is of the type having video information recorded by means of geometrical variations (not shown) in the bottom of a spiral groove 14 on the surface of the record. The record 12 includes a thin dielectric 18 covering a conductive material 16 which is disposed on a dielectric substrate 19.

Figure 3:
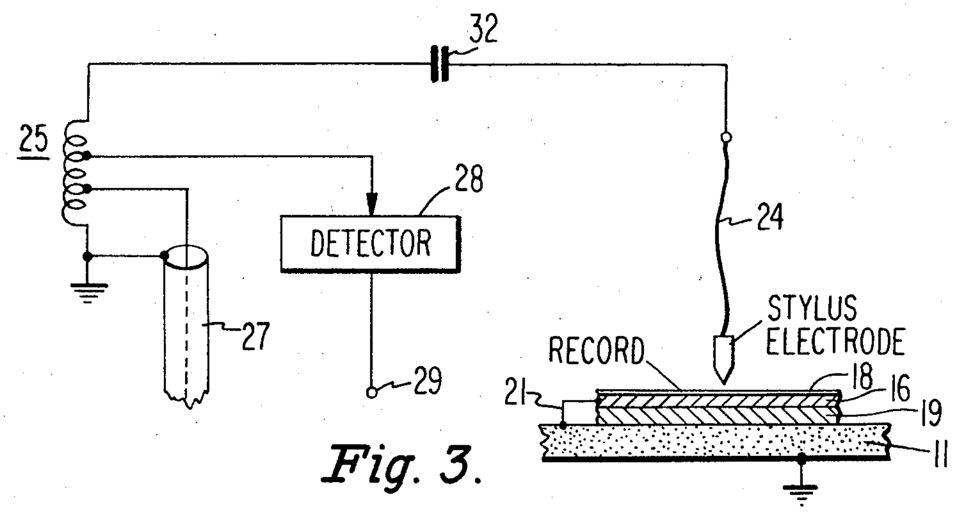
FIG. 3 is a partial diagrammatic and partial schematic view in simplified form of an embodiment of the invention.

A tracking stylus 20 engages the spiral groove 14. As shown more clearly in FIG. 2, the stylus 20 includes a support for a conductive electrode 22 which cooperates with the conductive material 16 and dielectric coating 18 on the disc record to form a capacitance. Such a stylus is described in a U.S. Pat. application, Ser. No. 286,657, filed Sept. 6, 1972, and now U.S. Pat. No. 3,826,877, for Marvin Allan Leedom and Michael Evans Miller and entitled, "Information Playback System Stylus." This patent application is also assigned to RCA Corporation. As the video disc record 12 is rotated, the conductive surface 22 of the stylus 20 while riding in the disc groove 14 cooperates with the record to establish capacitive variations due to the geometrical variations in the bottom of the spiral groove. The signal capacitance formed by the video disc record 12 and the stylus conductive electrode 22 is, as shown in FIG. 3, electrically connected by a flexible conductor 24 to a tuned circuit 25 which includes a point of electrical ground potential. A return path for the signal capacitance is through an electrical connection 21 between the conductive record layer 16 and a grounded conductive turntable 11. Alternatively such a return path may be through the capacitance of the conductive layer 16 and a conductive turntable 11. For example, the conductor 24 may be a beryllium copper wire or gold coated plastic strip. The circuitry of FIG. 3, which includes a tuned circuit 25, is housed within a conductive compartment 26 of the conductive housing 4. The tuned circuit is energized via lead 27 from a fixed frequency oscillator of known type which is not shown. For example, the frequency may be in the hundreds of MHz range. Since the fixed frequency oscillator signals are applied to the tuned circuit whose resonant frequency varies during operation, the response of the tuned circuit to the excitation signal voltage changes as a function of the recorded information. A detector means 28, such as a diode, is provided for monitoring these changes. This results in an output signal at terminal 29 whose amplitude varies as a function of the recorded information. Further discussion of such arrangements may be found in a U.S. Pat. application, Ser. No. 295,854, for Stephen Earl Hilliker and entitled, "Video Disc Transmission Line and Stylus RF Return Systems," assigned to RCA Corporation. The conductive compartment 26 may be sealed by a plate 30 having openings for passage of the beryllium copper wire 24.

As shown in arrangement of FIG. 3, a capacitive element 32 is connected in series circuit relation with the stylus and tuned circuit. Thus, in the arrangement shown in FIG. 3, a conductive path is provided from the stylus electrode and its associated conductor 24 to one terminal of the capacitive element 32 and from the second terminal to the tuned circuit 25. With such an arrangement only a charge sufficient to charge the capacitive element 32 to the voltage of the record surface need be passed through the electrode of the stylus. That is, $Q = CV$, where: $Q$ is the charge which flows in Coulombs, $C$ is the capacitance in Farads of the series capacitor, and $V$ is accumulated voltage of the record to which the capacitor charges.

More advantageous protection of the stylus is afforded by utilizing a capacitive element 32 having a small value of capacitance which limits the transfer of charge. However, the capacitive element 32 is in series connection with the variable signal capacitance, i.e., the variation of capacitance between the stylus electrode and the metallized surface of the record. Therefore, it is also desirable that the capacitance value of the element 32 should be substantially larger than the signal capacitance and the stray capacitance of the stylus electrode support and its associated lead, in order to minimize loss of playback sensitivity.

From laboratory test data, it appears that potentials on the record in the 10 volt range are hazardous to the stylus. A capacitance value of one picofarad for the element 32 has been found to be suitable for protection of the stylus against record potentials as high as about 300 volts. Other typical values are in the range of 0.001 pf (picofarads) for the signal capacitance; on the order of 0.25 pf for the stray lead capacitance; and 0.05 pf for the stylus support stray capacitance.

Figure 4:
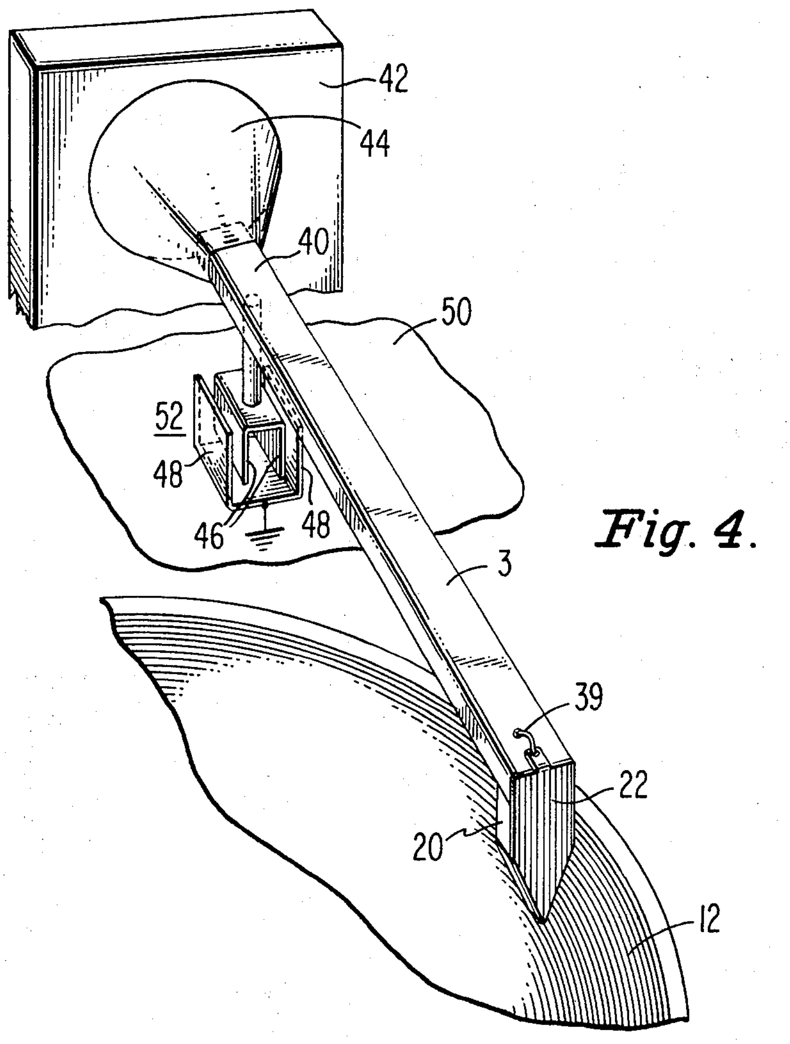
FIG. 4 is a perspective view of a further embodiment of the invention.

A further embodiment in accordance with the present invention is shown in FIG. 4. In FIG. 4, the stylus 20 has a conductive electrode 22 which cooperates with the disc record 12. The conductive electrode 22 is electrically connected by means such as a solder mass 39 to the stylus support arm. The arm 3 is also made of conductive material such as aluminum. The end 40 of the conductive arm 3 is pivotally supported from a fixed member 42 by means of an elastometric element 44. The elastometric element 44 is formed of a material such as rubber to thereby provide electrical isolation of the arm 3.

The end portion 40 of the arm 3 is electrically coupled to a base plate 50 through a capacitive element 52. As indicated, the base plate 50 is arranged to be disposed at or near electrical ground potential. Thus, an electrically conductive path to ground potential is provided for the stylus electrode 22 through the conductive arm 3 and the series connected arrangement of the capacitive element 52.

As shown in FIG. 4, the capacitive element 52 may comprise a first pair of generally flat rectangular conductive plate members 46. A second pair of generally rectangular conductive plate members 48 is secured to the base member 50. The plate members 46 are disposed in nested fashion between the pair of plate members 48 to form a capacitive element.

Although not shown, it will be understood that the conductive arm 3 may be enclosed within and spaced from the walls of a conductive housing to form a transmission line. In such an arrangement one conductor of such a transmission line is the arm 3, with the second conductor being provided by the enclosing housing. Such arrangements are more fully discussed in the U.S. Pat. application of Stephen Hilliker referenced supra.

Where such a transmission line formed by the arm 3 and the housing is a one-quarter wavelength type line, it is desirable to provide a low impedance with respect to ground at the end portion 40 of the arm 3. In such an arrangement, therefore, the capacitive value of the element 52 is made relatively large. For example, assume a one-quarter wavelength transmission line arrangement is to be operated at a frequency of about 900 MHz. At such a frequency an impedance of approximately 1 ohm is provided between the arm and ground potential when the capacitance of element 52 is on the order of 200 picofarads.

Where the transmission line arrangement is to be operated as a one-half wavelength transmission line, a higher impedance with respect to ground potential is desirable at the arm end 40. In such an arrangement for a frequency of about 900 MHz, the capacitive element 52, for example, may have a capacitance value on the order of 10 picofarads.

Thus, it will be understood that in either of such arrangements for the transmission line the stylus is protected by the series connected capacitive element 52, while the desired impedance for operation of the transmission line is preserved.

In the described arrangements supra, the electrical path for protection of the stylus is to be through the series connected path which includes the capacitive element. Thus, if conductive materials are utilized for portions of the stylus assembly and/or the tracking arm, it will be understood that suitable insulating portions or other means are provided to inhibit flow of charge from the stylus electrode into parallel charge flow paths, which, for example, may exist due to stray capacitance.

What is claimed is:

1. A playback system for use with a video disc record having geometrical variations in a spiral groove on a major surface of the disc record, said surface including a layer of conductive material covering a dielectric substrate, with a dielectric coating overlying said conductive layer; said system comprising: a rotatable turntable of conductive material direct current conductively connected to a point of reference potential; a tracking stylus supported for cooperative engagement with said record groove when said record is in a playback position, with said turntable in supporting engagement with a surface of said record opposed to said major surface; said tracking stylus including an electrode presenting a conductive surface which cooperates with said conductive layer and dielectric coating of said disc record to form a varying capacitance as said record is rotated during playback; means for normally precluding the charging of capacitance exhibited between said conductive layer and the conductive material of said turntable, said charging precluding means comprising conductive means for providing a direct current conductive connection between said conductive layer of said record and said point of reference potential; said charging precluding means being ineffective, however, in precluding the accumulation of charge on any region of said conductive layer undesirably subject to DC isolation from said conductive means; and means for developing electrical signal variations representative of the variations of said varying capacitance, said signal variation developing means including circuit means, separate from said varying capacitance and said conductive means, for establishing an electrical signal path between said stylus electrode and said point of reference potential; and wherein said separate circuit means includes means for limiting the flow of discharging current through said stylus electrode in the event of stylus engagement with a groove surface overlying any region of said conductive layer subject to said DC isolation from said conductive means, said limiting means including a capacitor interposed in said signal path in such manner as to effect DC isolation of said stylus electrode from said point of reference potential.

2. The invention according to claim 1, wherein said capacitor has a capacitance value substantially greater than said varying capacitance.

3. The invention according to claim 1, wherein the capacitance value of said capacitor is at least 1 picofarad.

4. In a video playback system for a video disc record having geometrical variations in a spiral groove on a major surface of said disc record, said record surface including a layer of conductive material covered with a coating of dielectric material, said conductive layer overlying a dielectric substrate, the combination comprising: a rotatable turntable comprising conductive material direct current conductively connected to a point of reference potential; a tracking stylus having a conductive electrode for engaging said spiral groove during rotation of said record in a playback position so that the capacitance exhibited between said conductive electrode and the conductive layer of said disc record varies as said record is rotated, said turntable being in supporting engagement with a surface of said record opposed to said major surface when said record is in said playback position; means for normally precluding the charging of capacitance between said conductive layer and the conductive material of said turntable, said charging precluding means comprising a conductor for providing a direct current conductive connection between the conductive layer of said disc record and said point of reference potential, said charging precluding means being ineffective, however, in precluding the accumulation of charge on any region of said conductive layer undesirably subject to DC isolation from said conductor; an inductive element; a discrete capacitive element; and means for electrically connecting said inductive element and said capacitive element in series between said stylus conductive electrode and said point of reference potential in such manner as to provide a tuned circuit having a resonant frequency which varies as said capacitance between said electrode and said conductive layer varies, with said capacitive element providing direct current isolation of said stylus electrode from said point of reference potential to limit the flow of discharging current through said stylus electrode in the event of stylus engagement with a groove surface overlying any region of said conductive layer subject to said DC isolation from said conductor, said capacitive element having a capacitance value more than an order of magnitude greater than the value of said varying capacitance between said stylus electrode and said conductive layer.

* * * * *